United States Patent [19]

Blytas et al.

[11] Patent Number: 5,338,870
[45] Date of Patent: Aug. 16, 1994

[54] THERMAL CONDENSATION OF POLYHYDRIC ALCOHOLS TO FORM POLYETHERCYCLICPOLYOLS

[75] Inventors: George C. Blytas, Houston; Eugene L. Holloway, Richmond; Anne H. Zuzich, Houston, all of Tex.

[73] Assignee: Shell Oil Company, Houston, Tex.

[21] Appl. No.: 933,617

[22] Filed: Aug. 21, 1992

Related U.S. Application Data

[63] Continuation of Ser. No. 672,200, Mar. 19, 1991, abandoned.

[51] Int. Cl.$^5$ ............................................. C07D 319/12
[52] U.S. Cl. .................................................... 549/378
[58] Field of Search ........................................ 549/378

[56] References Cited

U.S. PATENT DOCUMENTS

| | | | |
|---|---|---|---|
| 2,062,404 | 12/1936 | Dreyfus | 549/378 |
| 2,487,208 | 11/1949 | Alsop . | |
| 3,300,415 | 1/1967 | Ward | 549/378 |
| 3,425,960 | 2/1969 | Sandler et al. . | |
| 3,548,010 | 12/1970 | Yoshino et al. . | |
| 3,637,774 | 1/1972 | Babayan et al. . | |
| 3,968,169 | 7/1976 | Seiden et al. . | |
| 4,802,998 | 2/1989 | Mueller et al. | 252/8.514 |
| 5,058,679 | 10/1991 | Hale et al. . | |
| 5,072,794 | 12/1991 | Hale et al. . | |
| 5,076,364 | 12/1991 | Hale et al. . | |
| 5,076,373 | 12/1991 | Hale et al. . | |
| 5,083,622 | 1/1992 | Hale et al. . | |
| 5,085,282 | 2/1992 | Hale et al. . | |
| 5,198,416 | 3/1993 | Hale et al. . | |
| 5,198,532 | 3/1993 | Blytas et al. . | |
| 5,204,444 | 4/1993 | Frank et al. . | |
| 5,233,055 | 8/1993 | Blytas et al. . | |

FOREIGN PATENT DOCUMENTS

| | | |
|---|---|---|
| 324887A | 1/1988 | European Pat. Off. . |
| 333984A | 3/1988 | European Pat. Off. . |
| 374671A | 12/1988 | European Pat. Off. . |
| 374672A | 12/1988 | European Pat. Off. . |
| 382070A | 2/1989 | European Pat. Off. . |
| 382071A | 2/1989 | European Pat. Off. . |
| 386636A | 3/1989 | European Pat. Off. . |
| 386638A | 3/1989 | European Pat. Off. . |
| 391251A | 4/1989 | European Pat. Off. . |
| 391252A | 4/1989 | European Pat. Off. . |
| 398112A | 5/1989 | European Pat. Off. . |
| 398113A | 5/1989 | European Pat. Off. . |
| 399270A1 | 5/1989 | European Pat. Off. . |
| 3346094A | 7/1985 | Fed. Rep. of Germany . |
| 3842692A | 6/1990 | Fed. Rep. of Germany . |
| 43-19028 | 8/1968 | Japan . |
| 44-26672 | 11/1969 | Japan . |
| 45-7021948R | 7/1970 | Japan . |
| 58-198429A | 11/1983 | Japan . |
| 61-043627A | 3/1986 | Japan . |
| 61-140534A | 6/1986 | Japan . |
| 61-238749A | 10/1986 | Japan . |
| 2216573A | 10/1989 | United Kingdom . |
| 2216574A | 10/1989 | United Kingdom . |
| 2223255A | 4/1990 | United Kingdom . |

*Primary Examiner*—Nicky Chan

[57] ABSTRACT

Polyethercyclicpolyols are prepared by thermally condensing a polyol having at least three hydroxyl groups of which at least two of the hydroxyl groups are vicinal, precursors of the polyol, cyclic derivatives of the polyol, or mixtures thereof, and controlling process conditions to avoid substantial undesirable degeneration.

29 Claims, 1 Drawing Sheet

5,338,870

THERMAL CONDENSATION OF POLYHYDRIC ALCOHOLS TO FORM POLYETHERCYCLICPOLYOLS

This is a continuation of application Ser. No. 672,200, filed Mar. 19, 1991, now abandoned.

BACKGROUND OF THE INVENTION

This invention relates to polyethercyclicpolyols having high molecular weights and to the preparation thereof. In particular, the invention relates to the preparation of polyethercyclicpolyols which, due to improved molecular properties and characteristics, permit the preparation of improved drilling fluids which inhibit formation of gas hydrates, prevent shale dispersion, reduce swelling of the formation to improve wellbore stability, reduce fluid loss, and reduce filter cake thickness. Drilling muds incorporating the polyethercyclicpolyols of this invention are excellent substitutes for oil base muds in many applications.

Water-based drilling fluids comprise water, clays or polymers, and various treating agents which control the physical, chemical and/or rheological properties of drilling fluids in wellbores. In order to perform their function as drilling fluid additives, it is theorized, although the invention is not limited to this theory, that the polyethercyclicpolyol mixtures contain large water soluble molecules and have relatively limited crosslinking in view of their high molecular weight. It is difficult to produce polymeric molecules of this type of high molecular weight which do not have extensive crosslinking. Accordingly, the present invention provides a process which overcomes these and other problems in the art as more particularly disclosed hereinafter, and which produces polyethercyclicpolyols of significantly improved characteristics as drilling mud additives.

SUMMARY OF THE INVENTION

The purpose of the present invention is to form polyethercyclicpolyols by a thermal condensation reaction. This purpose is achieved by heating a reaction mixture comprising a reactant selected from the group consisting of (a) a polyol having at least three hydroxyl groups of which at least two of the hydroxyl groups are vicinal; (b) precursors of the polyol, (c) cyclic derivatives of the polyol, and (d) mixtures thereof, said heating initiating the thermal condensation; removing water formed during the thermal condensation; and continuing the thermal condensation until a predetermined quantity of moles of water per mole of reactant are removed, wherein the condensation goes to completion without undergoing degeneration, including extensive crosslinking to gel-like structures and carbonization. In another embodiment, the purpose of the invention is carried out by heating a reaction mixture comprising a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; and continuing the thermal condensation, which is initially endothermic, until the condensation becomes essentially thermally neutral, and prior to the reaction becoming exothermic which would lead to substantial undesirable degeneration, that is crosslinking or carbonization. In yet another embodiment, the purpose of this invention is realized by heating a reaction mixture comprising a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; and continuing the thermal condensation to completion while controlling the temperature and pressure of the reaction within predetermined ranges to avoid substantial undesirable degeneration and to maximize molecular weight. Another embodiment of the invention achieves the purpose thereof by heating a reaction mixture comprising a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; and continuing the thermal condensation while adding additional reactant in such a manner that the reaction proceeds to completion at a rate faster than the additional reactant is being incorporated, thereby maximizing molecular weight of the polyethercyclicpolyol. An additional embodiment of the invention achieves its purpose by heating a reaction mixture comprising a basic catalyst and a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; and continuing the thermal condensation to completion while controlling the temperature and pressure of the reaction within predetermined ranges to avoid substantial undesirable degeneration linking and to maximize molecular weight. The above stated purpose of the invention may also be realized by heating a reaction mixture comprising a reactant selected from the group consisting of (a) a polyol having at least three hydroxyl groups of which at least two of the hydroxyl groups are vicinal, (b) precursors of the polyol, (c) cyclic derivatives of the polyol, and (d) mixtures thereof, said heating initiating the thermal condensation; removing water formed during the thermal condensation; and continuing the thermal condensation and adding a final quantity of additional reactant to the reaction mixture when the thermal condensation is within a preselected degree of completion, thereby buffering the condensation and preventing undesirable degeneration (i.e., crosslinking and/or carbonization).

Description of Preferred Embodiments

Polyethercyclicpolyols

Figure 1:
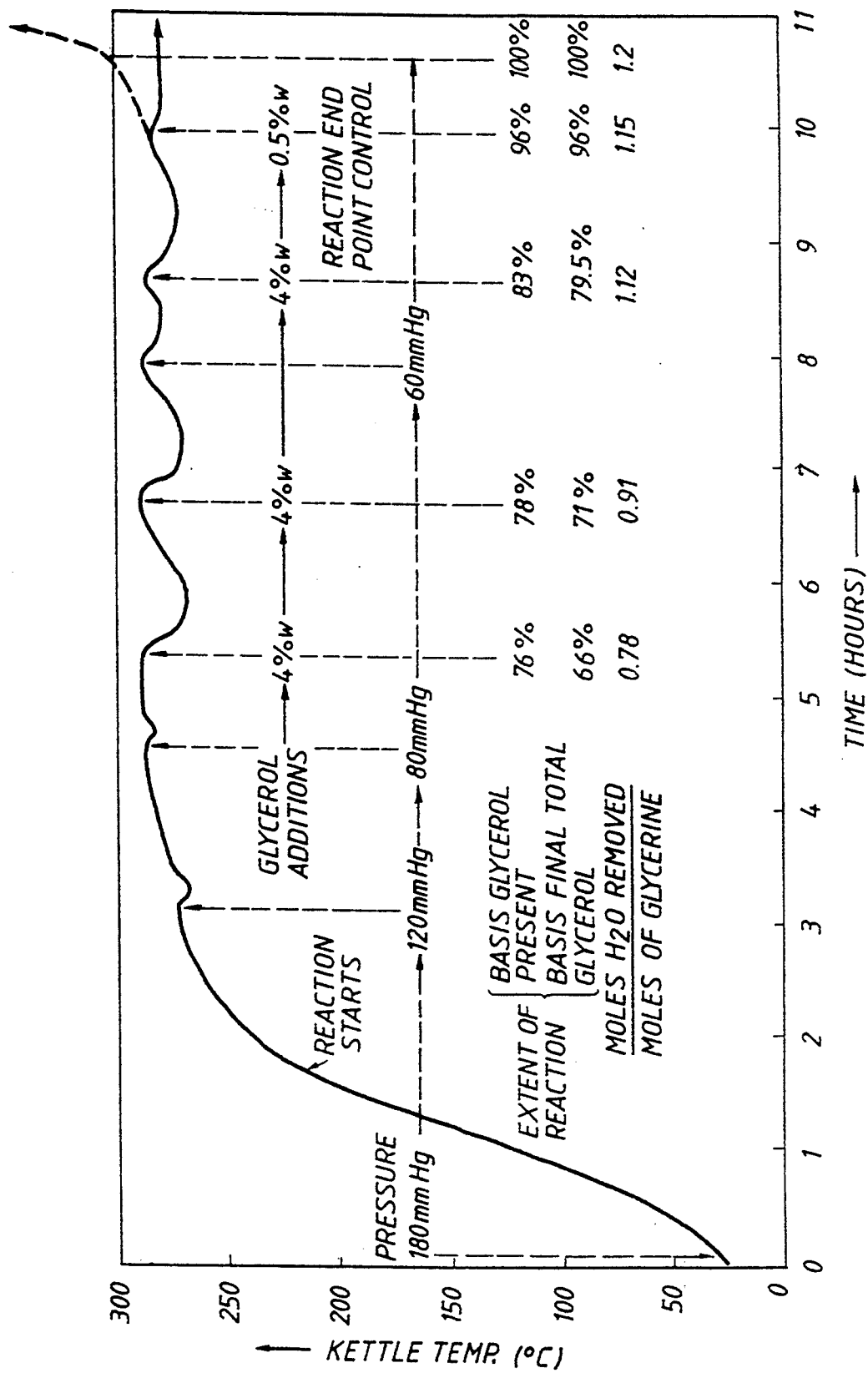
FIG. 1 shows temperature-time plot of a glycerol condensation reaction.

Polyethercyclicpolyols are those having at least 6 carbon atoms, at least 2 hydroxyl groups, and at least 2 ether linkages, but no more than 1800 carbon atoms, 450 hydroxyl groups, and 600 ether linkages. More preferably, polyethercyclicpolyols are those having at least 15 carbon atoms, 5 ether linkages, and at least 5 hydroxyl groups, or at least 15 carbon atoms, at least 7 ether linkages, and at least 3 hydroxyl groups. Most preferably, polyethercyclicpolyols are those having at least 18 carbon atoms, at least 6 hydroxyl groups, and at least 6 ether linkages but preferably no more than 1200 carbon atoms, 300 hydroxyl groups, and 400 ether linkages. Weight average molecular weights, $M_w$, [defined infra] preferably range from 50,000 to 200,000. Hereinafter "poly" is used to mean two or more, "mono" is used to mean one, "cyclic" is used to mean one or more rings, "ether" is used to mean one or more ether linkages, and polyethercyclicpolyol may also be called PECP or polycyclicpolyetherpolyol.

Polyethercyclicpolyols may be prepared by polycondensation of compounds such as (A) through (E) in VIII (infra) in chemical processes which are accompanied by significant expulsion of water molecules from the polymerizing compounds. The number of ether linkages equals the number of water molecules expelled. Taking (C) or (D) (infra) as the building unit, the lowest molecular weight structure containing two such units is Structure (I), containing two terminal hydroxyl groups, and five ether linkages. Structure I is formed by condensation from glycerol molecules with the expulsion of five water molecules.

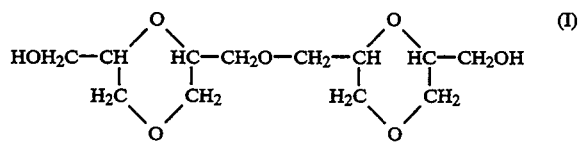

This structure is a dicyclicpoly (or penta) etherdiol, and can be called di-bis(hydroxymethyl)-1,4-p-dioxane.

Polyethercyclicpolyols also can be formed by further condensation or polycondensation of Structure (I) with itself, or with itself and with polyhydric, at least trihydric, monomers, e.g., glycerol monomers. Dimerization of structure (I) with expulsion of one mole or water yields:

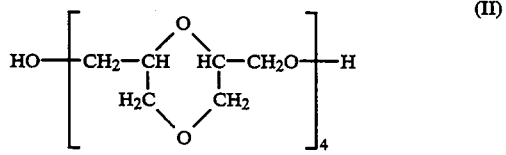

Copolycondensation of four structure (X) (infra) units with itself and with one polyhydric (at least trihydric) molecule, e.g., a glycerol molecule, can yield structure (III) and its isomeric equivalents:

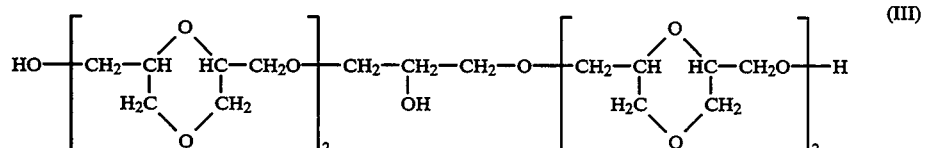

Analogous structures can be obtained from structures (X) (J), (X) (K), and (X) (N) (infra) by polycondensation. Structures based on (N) (infra) will have 5-membered rings. Spectroscopic techniques cannot conveniently distinguish between the 5- or 6-membered rings.

Structure (III) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units, or other polyhydric (at least trihydric) units, occur randomly in the structure. Disregarding the order of occurrence, a general chemical composition formula representative of all of these structures is:

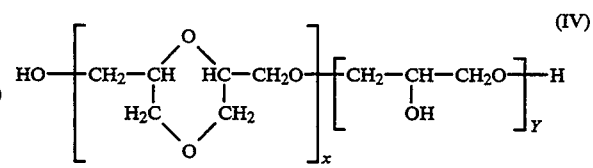

where $x \geq 1$ and $y \geq 0$.

The above structures are illustrative and not limiting of the invention.

Polyol Feedstock

Feed compounds of certain characteristics have been found useful in the preparation of high molecular weight polyethercyclicpolyols. Polyols that are at least trihydric and have at least two hydroxy groups in a vicinal position are required. Nonlimiting examples include monomers, oligomers and telomers of polyhydric alcohols (or their precursors, or combinations thereof) such as glycerol (which is the preferred feedstock), telomers of glycerol such as diglycerols, troglycerols, tetraglycerols, pentaglycerols, and hexaglycerols, mixtures of glycerol and telomers of glycerol such as diglycerol and triglycerols, mixtures of telomers of glycerol, 1,5,6,9-decanetetrol, 1,2,4,5-cyclohexanetetramethanol, 1,2,4,7-heptanetetrol, 1,2,3,5-heptanetetrol, 4,4-dimethyl-1,2,3-pentanetriol, 1,3,4-cycloheptanetriol, 1,2,3-pentanetriol, 1,2,4-pentanetriol, 2,3,4-pentanetriol, 1,1-cyclopentanediol, 1,2,3-cyclopentanetriol, 1,2,3-hexanetriol, 1,2,4-hexanetriol, 1,2,3,4-hexanetetrol, 1,2,4-cyclohexanetriol, 1,2,5-cyclohexanetriol, 1,2,3,4-cyclohexanetetrol, 1,2,3,5-cyclohexanetetrol, sorbitol, mannitol and copolymers of ethylene glycol and propylene glycols with the preceding alcohols.

The monomeric units which can enter into the polycondensation reactions to yield desirable polyethercyclicpolyols are alcohols containing at least three hydroxyl groups per molecule of which at least two are vicinal. Thus, glycols of any molecular weight do not meet the requirements. On the other hand, triols are quite suitable. Examples are butanetriols, such as 1,2,4-butanetriol, pentanetriols, such as 1,2,3-pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

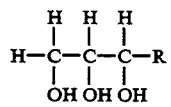     (V)

will yield several structures, one of which is illustrated by:

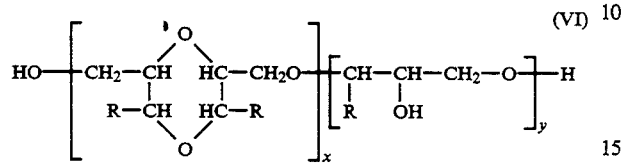     (VI)

The R group may itself be a group containing hydroxymethyl groups, which would in turn increase the potential for intermolecular condensation by expulsion of additional moles of water, and would increase the facility with which high molecular weight cyclic ether structures are obtained.

Examples of polyethercyclicpolyols obtained from trihydric alcohols with more than three carbons include the following:

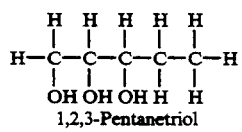     (VII)

1,2,3-Pentanetriol

The following monocyclicdietherdiols of pentanetriol are obtained from Structure VII in accordance with the methods described supra:

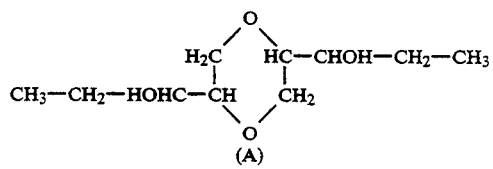

(A)

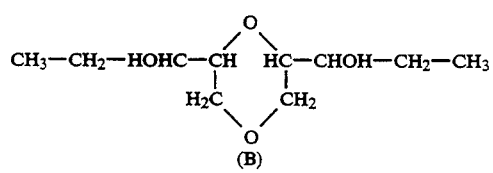

(B)

Both dimers (A) and (B) are obtained from Structure VII by reacting at carbons 1 and 2.

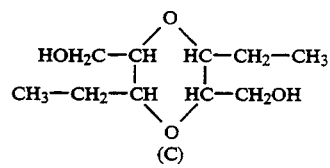

(C)

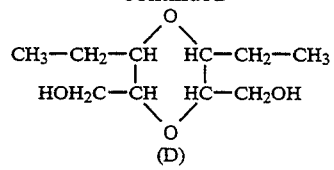

(D)

Both dimers (C) and (D) are obtained by reacting Structure (VII) at carbons 2 and 3.

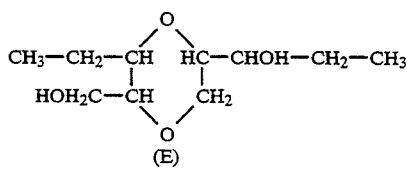

(E)

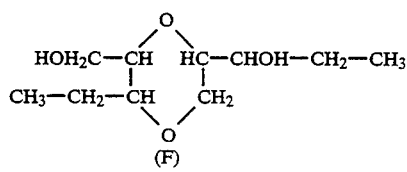

(F)

Dimers (E) and (F) are obtained from (VII) by reacting at 1, 2 and at 2, 3 positions.

Further polycondensation of the cyclicetherdiols (supra) will yield polycyclicetherpolyols with structures which depend on which hydroxyl groups are involved in the condensation reaction. For instance, reaction between Structures (VIII) A (supra) and (VIII) F (supra) will yield (IX) (infra), a dicyclicpentaetherdiol of pentanetriol as follows. Obviously, a large number of possible polycondensed structures exist.

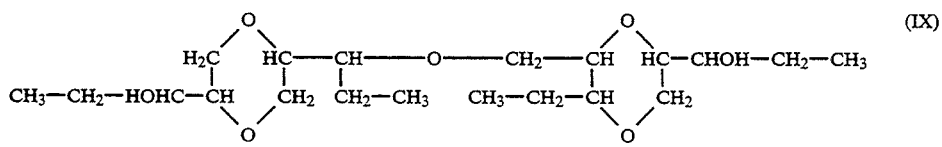     (IX)

Precursors of trihydric polyols are suitable feeds. For example, glycidol, an epoxy alcohol which is a precursor of glycerol, reacts by simple addition not involving dehydration or requiring the presence of catalysts such as sodium hydroxide and sodium acetate. Another example is epichlorohydrin which, upon reaction with water and sodium hydroxide, hydrolyzes to give glycerol and sodium chloride. This latter mixture then can be thermally condensed to yield polyethercyclicpolyols.

Representative structures of precursors of the polyols of interest as feeds in this invention are the epoxide structures (G) through (I) listed below. All of these structures satisfy the criterion of possessing at least one epoxide and one or more hydroxyl groups.

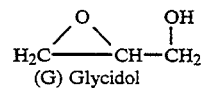

(G) Glycidol

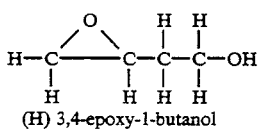

(H) 3,4-epoxy-1-butanol

The preferred structure of polyol precursors is given by:

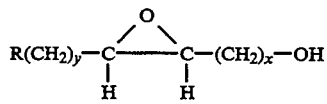

where R=alkyl, aryl, H, or OH
X≧1,
and Y≧0,
with the condition that when Y=0, then R=H.

The above precursors of epoxy alcohols can be conveniently prepared from the corresponding unsaturated alcohols by selective oxidation as shown for the case of glycidol below:

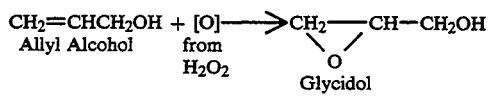

Derivatives of polyols are also useful feeds. For example, derivatives of glycerol, including linear and cyclic dimers, such as cis- or trans-2,5-bis(hydroxymethyl)-p-dioxane (J and K), cis- or trans-2,6-bis(hydroxymethyl)-p-dioxane (L and M), and the glycerine acetal of hydracrylaldehyde (N) can separately, or in combination, dimerize or can react with glycerol to produce polyethercyclicpolyols.

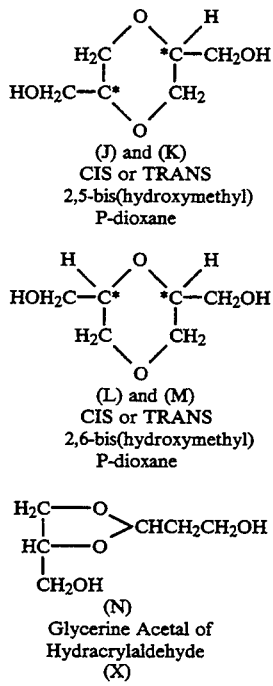

In structures J through M, CIS and TRANS refer to the stereoisomerism of the carbon atoms marked by an asterisk. Structures J through M can also be called bis(-hydroxymethyl)-p-dioxanes, monocyclicdietherdiols or cyclic dimers of glycerol.

Known commercial mixtures of bis(hydroxymethyl)-p-dioxanes and polyols can react to produce polyethercyclicpolyols. Polyols, e.g., polyglycerols, of a degree of dehydration corresponding from 0.5 to 1.0 moles water per mole of polyol are suitable feedstock. Footstill bottoms (heavy ends from the manufacture of glycerol) are mixtures of glycerol, bis(hydroxymethyl)-p-dioxanes, linear polyglycerols, and small amounts of low molecular weight polyethercyclicpolyols, are useful feedstock.

Byproduct or effluent streams from other existing processes for which the principal products are resins, soaps, and the like, can be excellent feedstocks. Exemplary are process streams of glycerol/glycidol mixtures which may also contain other components, for example, mixtures of glycerol, glycidol, epichlorohydrin, dimethyl ketone, isopropyl alcohol, and/or sodium chloride made in the manufacture of resins. Such streams may first be processed to remove the nonglycerol-related material, for example, sodium chloride. Effluent streams from processes such as resin manufacture fit this category of feedstock. Such streams may contain predominantly water and salt (10 to 15 percent by weight) with also small amounts of glycerol, glycidol, bis(hydroxymethyl)-p-dioxanes, and polyethercyclicpolyols of low molecular weight (and therefore initially ineffective for the use in drilling fluids). For example, in an existing plant, the components of an effluent stream are 12 to 15 percent by weight sodium chloride, 0.3 to 2 percent by weight glycerol, 0.3 to 1.2 percent by weight glycidol, and less than 0.5 percent by weight polyglycerols, bis(hydroxymethyl)-dioxanes, and low molecular weight polyethercyclicpolyols, with the balance being water.

PROCESS CONDITIONS

In a typical preparation in accordance with the invention, a polyol such as glycerol (which is the preferred feedstock) containing small amounts of catalyst such as sodium hydroxide, preferably along with small amounts of sodium acetate, are reacted in distillation apparatus under conditions which allow water to be removed overhead, but not substantial amounts of glycerol or its dimers and trimers. The catalyst, alkali metal hydroxide, preferably sodium hydroxide, is in a preferred concentration of 0.5 to 1.5 percent by weight of the reaction mixture and alkali metal acetate, preferably sodium acetate, in like or smaller amounts. Other suitable catalysts include potassium, lithium or calcium hydroxide or other condensation catalysts, such as sodium tungstate or tin (IV) chloride.

The starting pH for the condensation reaction ranges from 5 to 13.5 and is preferably from 8 to 10. The pH gradually declines during the process to 5 to 9.5 and preferably to 6.5 to 9. The materials removed overhead in the distillation are acidic to neutral and have a pH ranging from 3 to 7.

The reaction mixture is heated under a pressure of at least 100 mm Hg, and preferably between 150 and 300 mm Hg. For glycerol, more preferably 160 to 230 mm Hg is used. Under these conditions, any free water, which is often present in very small amounts even in dry glycerol, will be distilled off. Moreover, water produced by the condensation reactions will be distilled off continuously, allowing the equilibrium-limited condensation reaction to proceed further and to completion. Water removal may be facilitated by bubbling an inert gas, such as nitrogen, through the mixture. Such bubbling will also ensure thorough mixing. The mixture may also be continuously stirred to ensure thermal equilibrium throughout. The dry glycerol will then begin to rise in temperature to about 210° to 230° C. at 150 to 300 mm Hg, at which temperature the mixture refluxes, indicating the onset of reactions which produce water by condensation of the glycerol. By maintaining a pressure of at least 160 mm Hg, the glycerol, which may volatilize along with the water, is condensed in an overhead condenser, which is preferably cooled by a coolant such as water/glycol mixtures. The glycerol and its linear and cyclic dimers, which form in the course of the volatilization process, are thus condensed and refluxed to the reacting mixture. Gradually the procedure results in an increase in the boiling point of the mixture, brought about by the continuous removal of water of condensation and by the increase of the molecular weight of the mixture.

As the degree of the polymerization increases, and the amount of water removed from the glycerol feed increases, the pressure over the mixture is gradually decreased externally, either in a continuous, preferably gradual, mode, or at selected reaction temperatures. For example, it is possible to reduce the pressure to 120 mm Hg when the mixture reaches 250° C. at a pressure of 180 mm Hg. Or alternatively, it is possible to control the pressure to diminish gradually by known mechanical means. FIG. 1 discloses a stepwise pressure reduction: 180 mm Hg to 120 mm Hg to 80 mm Hg to 60 mm Hg.

The degree of dehydration during the procedure is monitored in terms of moles of water removed per mole of glycerol left in the product. As the ratio of moles of water removed per mole of glycerol in the product increases, the degree of polymerization of glycerol increases, and the number average molecular weight of the mixture increases. Particularly important is the discovery of the strong relationship between the weight average molecular weight ($M_w$) and the performance of the product as a drilling fluid additive.

The number average molecular weight $M_n$ is determined by the formula:

$$M_n = \frac{\sum_i n_i M_i}{\sum_i n_i}$$

wherein
i = all molecules in the sample,
$n_i$ = the number of molecules, and
$M_i$ = the molecular mass of each molecule.

This is the average molecular weight obtained when the total weight of the sample is divided by the number of molecules in the sample. This molecular weight determines the effect of the sample composition on the osmotic pressure and hence, the effect of the sample composition on the freezing point or other colligative properties of the total mixture.

The weight average molecular weight $M_w$ is determined by the formula:

$$M_w = \frac{\sum_i n_i M_i^2}{\sum_i n_i M_i}$$

This molecular weight number weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample composition on those properties which depend on the size of the individual molecules, such as effectiveness in light scattering, or ability of the molecule to penetrate into small openings or plug or cover such openings. Thus, a high $M_w$ would be beneficial if penetration of the molecules into the interplanar structure of layered clays in the formulation is to be avoided. While the invention is not limited by this theory, it is believed that when polyethercyclicpolyols of this invention are used in drilling fluids, the presence of molecules possessing large volumes minimizes the swelling of clay components in the wellbore, thereby improving wellbore stability.

The centrifuge molecular weight is determined by the formula:

$$M_z = \frac{\sum_i n_i M_i^3}{\sum_i n_i M_i^2}$$

The ratios $M_w/M_n$ and $M_z/M_w$ are also an indication of the spread or polydispersity in the molecular weight of molecules present in the sample, and by definition $M_w \geq M_n$. The ratio $M_w/M_n$ ranges from 50 to 500, and most preferably, in the best formulations of polyethercyclicpolyol, it ranges from 100 to 300. The ratio of $M_z/M_w$ ranges from 1 to 100, and in the most preferred formulations it ranges from 2 to 20. The polydispersity of molecular weights is underscored by the appearance of a characteristic binodal molecular weight distribution in virtually all thermal polyethercyclicpolyol samples.

In order to attain high $M_w$ values it is necessary to carry out dehydration as far as possible. By dehydration under gradually decreasing pressure it is possible to achieve a degree of dehydration which approaches and exceeds 1 mole of water per mole of glycerol. At this point, theoretically the glycerol feed could have polymerized to yield a single molecule of infinitely high molecular weight. However, in the course of distillation of glycerol from a basic medium, extensive cyclization takes place, which yields compounds such as cis- or trans-2,5-bis(hydroxymethyl)-p-dioxane, cis- or trans-2,6-bis(hydroxymethyl)-p-dioxane and the glycerine acetal of hydracrylaldehyde, or other 5-, 6-, or 7-membered ring structures of which the first two are predominant. The polycondensation of such cyclic structures with linear or branched polyglycerols yields polyethercyclicpolyols. Excellent polyethercyclicpolyols for drilling fluid applications can be obtained by dehydrating to the extent of 1.15 to 1.2 moles of water per mole of glycerol in the product.

Polyethercyclicpolyols are characterized by the presence of at least one and usually more than one 5- to 7-membered ring structures per individual molecule in at least 80 percent of the molecular mass. Moreover, a minimum of 20 percent, preferably 30 percent, and most preferably 40 percent, of all molecules of reactant participating in the formation of polyethercyclicpolyols are involved in cyclic structures.

The preferred way to achieve such extensive dehydration without undesirable degeneration and gelation of the polyethercyclicpolyols is by the addition of small amounts of polyol, e.g., glycerol, at a later stage of the reaction, for example, when the reaction medium temperature has reached 270° to 280° C. at a pressure of 50 to 100 mm Hg, preferably 60 to 90 mm Hg. At least 3 percent by weight of polyol should be added to that effect, although more typically larger aliquots are added not once but several times. Upon addition of 2 to 6 percent by weight of polyol, e.g., glycerol, (basis final weight of polyol added) at a point after removal, for example, of 0.8 moles of water per mole of polyol, a drop in the temperature of the reacting mixture occurs, the drop being several degrees Centigrade or Fahrenheit. The drop is caused by the lower temperature of the polyol being added, but more importantly indicates the endothermic nature of the reaction between polyol molecules, or preferably between added polyol molecules and reactive sites in the prepolymerized mixture. For better effectiveness, the added polyol, e.g., glycerol, may be pre-saturated with alkali metal hydroxide, e.g., sodium hydroxide. FIG. 1 shows stepwise addition of polyol with corresponding temperature changes. In general the stepwise addition of glycerol should be initiated when the reaction is at least 40 percent complete (basis the amount of reactant present at the end of the reaction).

Upon continued input of heat from an external source, the temperature of the reacting mixtures rises to the previous highest level, or to a higher level, or to a somewhat lower level than the first high temperature, depending upon the molecular weight distribution of polyethercyclicpolyols in the mixture. This results in at least some of the polymerized polyol compounds achieving higher and higher molecular weights. Since the $M_w$ values are very sensitive to the presence of even small amounts of large molecules, this procedure results in increasing $M_w$ values which, generally results in improved performance in drilling mud formulations. This procedure of incremental polyol addition can be repeated any number of times, three being a convenient number. With three additions of polyol the experimental reaction time usually takes 6.5 to 7 hours, and when optimally performed, excellent polyethercyclic polyols are obtained.

The final $M_w$ values obtained are a strong function of the maximum temperature used in the polymerization reaction. Typical maximum temperatures range from 250° C. to 295° C. at a pressure 40 to 80 mm Hg, preferably 270° C. to 295° C., and most preferably 275° C. to 285° C.

As the reaction approaches 85 percent completion, it is suitable to combine polyol additions with further reductions of pressure, going down to 30 mm Hg, or even lower. This results in deeper dehydration at a given temperature and therefore in higher $M_w$ and $M_n$ values.

TERMINATION OF REACTION

As the reaction of the present invention approaches completion, it turns from being highly endothermic to being more thermally neutral, and at a dehydration approaching and exceeding 1.2 moles of water per mole of polyol it can become exothermic. This is a reflection of the propensity of the mixture to undergo rapid degeneration of the complex polyethercyclicpolyol structures. In order to avoid the occurrence of such an undesirable degeneration, it is preferred to buffer the reaction by adding a small amount of monomeric polyol such as glycerol, for example, 0.2 to 2 percent, and preferably 0.3 to 0.9 percent by weight total. Preferably, there is added 0.5 percent by weight of polyol at a selected time such as when reaction is at least 90 percent complete, or preferably at a point where the reaction is 95 percent complete, i.e., after removal of 1.12 to 1.15 moles of water per mole of polyol in the reaction medium. FIG. 1 shows reaction end point control. The dotted line shows what could happen to temperature without a final addition of polyol, as the reaction becomes exothermic, leading to substantial degeneration and the formation of sludge. After reaction is terminated the polyethercyclicpolyol is removed from the reaction kettle by dilution with at least 20% w water.

DEHYDRATION IN RELATION TO FEED COMPOSITION

With glycerol as the primary reaction medium, it is preferable to remove at least 1.05 and more preferably at least approximately 1.12 moles of water per mole of glycerol. Most preferably 1.15 to 1.25 moles of water per mole of glycerol in the product should be removed. If the feed contains an appreciable amount of predehydrated glycerol polymers, then the remaining dehydration will be less than 1.2 moles per mole of glycerol. As an example, for a known commercial product which typically contains 15 percent by weight of bis(hydroxymethyl)-dioxanes, and 85 percent by weight of glycerol the dehydration can be calculated as follows. For approximately 100 grams of feed there are 85 grams of glycerol (0.99 moles) and 15 grams of bis(hydroxymethyl)-dioxane (0.1014 moles). The glycerol component will have to lose $0.92 \times 1.2 = 1.104$ moles of water. The 0.1014 moles of bis(hydroxymethyl)-dioxane is derived from 0.2028 moles of glycerol by removal of 0.2028 moles of water; 1.2 total moles water per mole of glycerol should be removed, i.e., $0.2028 \times 1.2 = 0.2434$ moles. Thus, it is necessary to remove $0.2434 - 0.2028 = 0.0406$ moles of water. The total to be removed is 1.104 moles from the glycerol $+ 0.0406$ moles from the bis(hydroxymethyl)dioxane $= 1.1496$ moles water (or approximately 1.145 moles) from the 100 grams of the known commercial product.

Therefore it is necessary to remove close to 1.2 moles of water for each mole of glycerol which enters into the condensation of an initially partially dehydrated glycerol feed stream. Alternatively, in most cases involving complex feed streams, it would be appropriate to carry out the reaction and select a final maximum reaction temperature at set pressure conditions, such as is known from previous experience to yield satisfactory polyethercyclicpolyol preparations.

Certain prehydrated glycerol feeds are not preferred for preparation of good quality polyethercyclicpolyol. An example is an extensively degenerated footstill bottoms (heavy ends from glycerol manufacture). In such cases, an acceptable feed may still be recovered from such materials by proper separation/purification. For example, extraction of the lower molecular weight fraction of a footstill bottom product by use of a low molecular weight alcohol, followed by recovery and reuse of the extracting alcohol. Alternatively, however, small amounts of extensively dehydrated polyglycerols can be used as additive components of the glycerol-rich feed, provided they are not unduly degenerated to yield essentially gel-like compositions.

EXAMPLES

EXAMPLE 1

Thermal Polycondensation of Glycerol with Final Small Glycerol Addition to Avoid Exothermicity About 859 grams of glycerol were placed in a 2-liter round bottom distillation flask along with 6.2 g of sodium hydroxide and 3.6 g of sodium acetate and the pressure of the unit was brought to 180 mm Hg using a N₂ blanket. The pressure was controlled by a bleed and makeup device using a low pressure N₂ source. The temperature was then raised gradually to 220° C. kettle temperature at which point reflux was obtained reflux through a 1-inch diameter 15-inch diameter tall Vigreaux column, equivalent to ca. 10 plates, connected to the distillation flask. The column was not insulated. A magnetically controlled variable reflux distillation head was used to control the reflux ratio at 1:1 and water-rich overhead was obtained. Under these conditions, the loss of glycerol to the overhead was kept at a minimum and water-rich overhead was continuously removed as the polycondensation reaction proceeded. By allowing the aqueous overhead to reach a volume of 60 ml (about 62 grams) the boiling temperature of the partially polymerized glycerol mixture reached 247° C. at 180 mm Hg. The reaction continued until the boiling point of the mixture reached 250° C. at 180 mm Hg. At this point the pressure was adjusted to 100 mm Hg. As a result the kettle temperature was reduced to about 243° C. at 100 mm Hg. The reaction was continued, and an additional 60 ml of aqueous overhead was removed by the time the kettle temperature reached 249° C. at 100 mm Hg. The reaction continued to a kettle temperature of 260° C. and the pressure was reduced to 80 mm Hg, with a resulting drop in temperature of about 2° C. The pressure was reduced again to 60 mm Hg when kettle temperature reached 275° C., with a resulting temperature drop of 3° C. At this point a third 60 cc overhead fraction was collected for a total of 180 cc, as the kettle temperature reached 276° C. at 60 mm Hg. At 285° C. kettle temperature the pressure was reduced to 40 mm Hg. The reaction was terminated after an additional 60 cc overhead (total 240 cc overhead) at a kettle temperature of 273° C. Shortly before the last fraction was collected, i.e., at 50 cc, an aliquot of 5 g of glycerol was added to the mixture to prevent rapid exothermic reaction from setting in, probably caused by the rapid degeneration linking of the produced polyethercyclicpolyols. A total of 1.22 moles of water was recovered per mole of glycerol which was still in the kettle in the form of a polymerized product. The resulting sample contained substantial percentage of the glycerol molecules in cyclic structures and exhibited $M_w$ values of 80,000. A small amount of gel-like product was detected in this preparation. The product was a very viscous semi-solid material at room temperature, but it was totally soluble in 30% w water/70% w product mixture.

EXAMPLE 2

Thermal Polycondensation of Glycerol in which Unpolymerized Glycerol is Added at a Later Stage During the Course of the Reaction A similar thermal polycondensation run was performed as the one described in Example 1, except that in this example, the run was initiated with 750 g of glycerol in the kettle containing 5.4 g sodium hydroxide and 3.6 g of sodium acetate used as the catalyst. The reaction was allowed to proceed to a degree of polycondensation resulting in a mixture of polyethercyclicpolyols which had a boiling point of 281° C. at 80 mm Hg. At this point 28 cc of sodium hydroxide-saturated glycerol was added through an auxiliary addition funnel, which was attached to the reaction vessel. The addition caused the kettle temperature to drop to 270° C. by virtue of its lower temperature and by virtue of the endothermic reaction between the monomeric glycerol and the reactive sites in the partially polymerized polyethercyclic polyols. The kettle temperature was allowed to rise again to 275° C. at 80 mm Hg at which point a second addition of 28 cc (36 g) of glycerol saturated with NaOH was added. The temperature of the mixture dropped to 261° C. and was allowed to come back up to 275° C., at which point the pressure of the system was reduced to 60 mm Hg. The reaction was again allowed to proceed to a degree of polycondensation that resulted in a boiling point of 275° C. at 60 mm Hg. At this point a third addition of glycerol (28 cc, 36 g) was made and allowed the reaction to proceed to 285° C. Throughout this operation the aqueous overhead containing minor amounts of glycerol and diglycerols was being removed at a 1:1 reflux as per example 1. When a total of 230 cc of overhead were collected, a 5 g aliquot of sodium hydroxide-free glycerol was added to prevent the onset of undesirable exothermic reactions. The reaction was terminated at an overhead volume of 240 ccs. At this point 1.2 moles of water were removed per mole of glycerol in the product. The $M_w$ volume obtained was 100,000. No gel-like material was detected in this preparation, indicating less degeneration under the conditions of this run, relative to those in the first example. Thus, addition of glycerol at a later stage reduces the degeneration propensity of high molecular weight polyethercyclicpolyols.

The three glycerol additions made in this run were made at the following points in the course of the reaction.

| Completion of Reaction Basis: | | |
| --- | --- | --- |
| | Glycerol Present | Glycerol at the End |
| First addition | 75.5% | 66% |
| Second addition | 78% | 71% |
| Third addition | 88% | 79.5% |
| Final small additions | 96% | 96% |

The product was a viscous semi-solid material at room temperature, the viscosities decreasing rapidly as the temperature region at which it was formed (250° to 280° C.) is approached. The product was water soluble.

EXAMPLE 3

Thermal Polycondensation of Glycerol/2,6-Bis(hydroxymethyl)-p-dioxane Mixture with Glycerol/2,6-Bis(hydroxymethyl)-p-dioxane Added at Later Stages Into the equipment used in Examples 1 and 2 above was introduced 750 g of a mixture consisting of 85% w glycerol and 15% w 2,6-bis(hydroxymethyl)-p-dioxane. The procedure described above in Example 2 was then followed closely as regards to timing of the pressure reductions and glycerol additions, including the timing of the three 28 cc (36 g) glycerol additions and the 5 g glycerol addition prior to terminating the reaction. In this run, however, the glycerol additions were replaced by addition of feed mixture (presaturated with NaOH). The total overhead volume in this run was ca. 194 cc, or about 200 g. The removal of water corresponded to ca. 1.142 moles of water per mole of glycerol constituting the feed, where a 2,6-bis(hydroxymethyl)-p-dioxane molecule is considered equivalent to 2 moles of glycerol. The $M_w$ achieved was a 65,000.

EXAMPLE 4

Glycerol/Polyglycerols Mixture as a Feed with Glycerol Added at Later Stages Into the equipment used in Examples 1 to 3, was introduced a concentrate of glycerol obtained from the effluent of a resins plant. The concentrate contains 59% w glycerol, 10% w 2,6-bis(hydroxymethyl)-p-dioxane, and 19% w oligomers of glycerol, including dimers, trimers, and tetramers. The procedure described in Examples 1 and 2 is followed. The initial feed loading is 795 g of ERU-5 effluent concentrate, of which 6 percent is water and 5% w NaCl. A total of 105 g of sodium hydroxide-saturated glycerol is added in three doses. The total overhead was ca. 31% w. The polyethercyclic polyol product had a $M_w$ volume of 75,000. Some of the NaCl present precipitates in the course of the reaction due to decreased solubility. However, the entire mass is completely miscible at a 30% w water/70% w polyethercyclicpolyols ratio.

EXAMPLE 5

Production of Polyethercyclicpolyols by Thermal Polycondensation of a Stream Containing Glycidol, Glycerol, Water, and Sodium Chloride A sample of process stream containing 2.5% w glycidol, 0.2% w glycerol, 3% w isopropyl alcohol, 1.5% w epichlorohydrin, 1% w NaCl, balance water, can be used to produce polyethercyclicpolyols as follows.

The sample is first distilled in a 20-plate distillation column at a bottom temperature of 180° to 200° F., and top pressure of ca. 4 psia. In the distillation essentially all of the epichlorohydrin, isopropyl alcohol, and the major portion of the water, are taken overhead and condensed. The epichlorohydrin and isopropyl alcohol are recovered for reuse in the plant. The bottoms from the distillation column contain 25 to 30% w glycidol, 7 to 15% w glycerol, 30 to 40% w water, and are saturated with salt at ca. 10% w solubility. The bottoms also contain 15% w of solid NaCl when the temperature is allowed to drop to ca. 70° F. The bottoms stream is further dehydrated in a second distillation during which some of the glycidol converts to glycerol. The glycidol/glycerol mixture, either alone or in admixture with more glycerol, constitutes an excellent feed for the formation of polyethercyclicpolyols by thermal polycondensation as discussed in Example 2.

EXAMPLE 6

Glycerol Footstill Bottoms as a Partial Source of Polycyclicetherpolyols

Many processes for the manufacture of synthetic and natural glycerol produce a salt-rich footstill bottoms steam. Some or all of these bottom products are useful as materials of admixture into glycerol feeds for the production of polycyclicetherpolyols.

A footstill bottoms sample can be conveniently desalted by mixing with 1-pentanol, 1-butanol, or 1-propanol, which results in copious NaCl precipitation and reduction of the viscosity of the footstill bottoms/NaCl mass. With 1-butanol, the precipitation can be carried out at 90° to 110° C., which allows 98 percent of the salt to precipitate. The mixture is then cooled to allow phase separation of the n-butanol from the desalted footstill bottoms. Small amounts of 1-butanol left in the footstill bottoms phase are removed by distillation. The desalted footstill bottoms are dissolved into glycerol to a level of 5 to 25 percent by weight and the mixture is polycondensed as discussed in Example 2.

EXAMPLE 7

Using Glycerol and Polyglycerols Obtained from the Overheaded Aqueous Product of the Polycondensation Reaction In Example 2, about 60 g of glycerol, diglycerol, and 2,6-bis(hydroxymethyl)-p-dioxane were obtained in the aqueous overhead of 245 grams. The overhead was also slightly acidic at a pH of 4.2. Upon distillation of the water from the overhead, a near-neutral glycerol/oligoglycerol bottoms was obtained (60 g) which was admixed with 690 g of glycerol to make up the feed for another thermal polycondensation run. The $M_w = 110,000$, somewhat higher than that obtained in Example 2, reflecting the effect of prepolymerization of part of the glycerol.

EXAMPLE 8

Formation of Polyethercyclicpolyols From Glycerol Derived by the Basic Hydrolysis of Epichlorohydrin A concentrated solution containing 208 g of sodium hydroxide (5.2 moles) in a saturated water solution is added to the 2-liter distillation unit described in the preceding examples; 460 g of epichlorohydrin (5 moles) are placed in a pressure equalizing addition funnel attached to the distillation unit. (Caution: the experiment must be carried out in a well-ventilated hood.) The aqueous NaOH mixture is heated to 100° C., and the epichlorohydrin is added slowly to the mixture at a rate sufficient to keep the temperature at about 110° C. The mixture is held at 110° C. for four hours. The epichlorohydrin reacts with the sodium hydroxide and water to yield glycerol and NaCl, which is only partially soluble in the mixture. Undissolved NaCl is removed by filtration.

The resulting glycerol/NaCl mixture is then returned to the distillation unit to be dehydrated, and the dry glycerol is thermally polycondensed as described in Example 2 above. The solubility of NaCl in the resulting polyethercyclicpolyol is less than in glycerol, so some precipitation occurs. However, upon addition of 50 percent by weight of water (on the basis of polyethercyclicopolyols present), the entire mixture becomes soluble to give a polyethercyclicpolyol/NaCl/water mixture which is suitable for use directly as a drilling mud additive. Alternatively, much of the salt may be removed from the polyethercyclicpolyol product prior to dilution with water by precipitation with a lower monoalcohol, such as 1-pentanol, 1-butanol, or 1-propanol. The lower monoalcohol may be removed from the polyethercyclicpolyol product mixture after the sale precipitation (followed by a filtration to remove the solid NaCl) by distillation.

Molecular Weight Determinations

Molecular weights referred to herein have been determined using a three-column gel permeation chromatographic technique using three Ultrahydrogel columns; a Linear column, a 250 angstrom column, and a 120 angstrom column in series, using water solvent at 30° C. Using this technique, polyethercyclicpolyols produced by the methods described herein range from $M_w$ values of 20,000 to 300,000. Preferred polyethercyclicpolyols have $M_w$ values in the range of 50,000 to 200,000.

What is claimed is:

1. A method for preparing polyethercyclicpolyol by thermal condensation, comprising:
   (a) heating a reaction mixture in the presence of an alkali metal hydroxide catalyst, said reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation; and
   (c) continuing the thermal condensation until at least 1.05 moles of water per mole of reactant are removed, wherein the condensation goes to completion without incurring substantial undesirable degeneration.

2. A method for preparing polyethercyclicpolyol by thermal condensation, comprising:
   (a) heating a reaction mixture in the presence of an alkali metal hydroxide catalyst, said reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation; and
   (c) continuing the thermal condensation, which is initially endothermic, until the condensation becomes essentially thermally balanced, and prior to the reaction becoming exothermic which would lead to substantial undesirable degeneration.

3. A method for preparing polyethercyclicpolyol by thermal condensation, comprising:
   (a) heating a reaction mixture in the presence of an alkali metal hydroxide catalyst, said reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation; and
   (c) continuing the thermal condensation to completion while controlling the temperature and pressure of the reaction within 250° to 295° C. and 40 to 80 mm Hg to avoid substantial undesirable degeneration and to maximize molecular weight.

4. A method for preparing polyethercyclicpolyol by thermal condensation, comprising:
   (a) heating a reaction mixture in the presence of an alkali metal hydroxide catalyst, said reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation; and
   (c) continuing the thermal condensation while adding additional reactant in such a manner that the reaction proceeds to completion at a rate faster than the additional reactant is being incorporated, thereby maximizing molecular weight of the polyethercyclicpolyol.

5. A method for preparing polyethercyclicpolyol by thermal condensation, comprising:
   (a) heating a reaction mixture comprising a basic catalyst and a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensations; and
   (c) continuing the thermal condensation to completion while controlling the pH of the reaction mixture within a starting pH of 5 to 13.5 and a final pH of 5 to 9.5 by addition of the basic catalyst.

6. A method for preparing polyethercyclicpolyol by thermal condensation, comprising:
   (a) heating a reaction mixture in the presence of an alkali metal hydroxide catalyst, said reaction mixture comprising a reactant selected from the group consisting of (1) a polyol having at least three hydroxyl groups of which at least two of the hydroxyl groups are vicinal, (2) precursors of the polyol, (3) cyclic derivatives of the polyol, and (4) mixtures thereof, said heating initiating the thermal condensation;
   (b) removing water formed during the thermal condensation; and
   (c) continuing the thermal condensation and adding a final quantity of additional reactant to the reaction mixture when the thermal condensation is at least 90% complete, thereby buffering the condensation and preventing undesirable degeneration.

7. The method of claim 2 wherein the reactant is glycerol and at least 1.05 moles of water per mole of the glycerol are removed.

8. The method of claim 7 wherein least 1.12 moles of water per mole of glycerol are removed.

9. The method of claim 7 wherein 1.15 to 1.25 moles of water per mole of glycerol are removed.

10. The method of claim 2 wherein the reactant is a mixture including glycerol and cyclic derivatives of the glycerol and wherein the moles of water removed per mole of the cyclic derivatives of glycerol is equal to at least 1.05 minus the moles of water which would have been removed in thermally condensing the cyclic derivatives of the glycerol from a glycerol feedstock.

11. The method of claim 1 wherein the reactant is glycerol and additional glycerol is added to the reaction mixture after the thermal condensation is at least 40 percent complete, basis the amount of reactant present at the end of the reaction.

12. The method of claim 11 wherein the added glycerol is at least 3 percent by weight of the total glycerol.

13. The method of claim 1 wherein the reactant is glycerol and a minor quantity of glycerol is added to the reaction mixture when the thermal condensation is at least 90 percent complete.

14. The method of claim 13 wherein the minor quantity of glycerol is added to the reaction mixture when the thermal condensation is at least 95 percent complete.

15. The method of claim 13 wherein the added glycerol is 0.2 to 2.0 percent by weight of the total reactant mixture.

16. The method of claim 13 wherein the added glycerol is 0.3 to 0.9 percent by weight of the total reactant mixture.

17. The method of claim 1 including controlling the temperature of the reaction mixture to stay below a maximum within the range of 250° to 295° C. at a pressure of 40 to 80 mm Hg.

18. The method of claim 17 wherein the maximum temperature of the reaction mixture is within the range of 270° to 295° C.

19. The method of claim 17 wherein the maximum temperature of the reaction mixture is within the range of 275° to 285° C.

20. The method of claim 1 wherein the alkali hydroxide catalyst is employed to control the starting pH of the reaction within a range of 5 to 13.5, and the final pH of the reaction mixture within a range of 5 to 9.5.

21. The method of claim 20 wherein the starting pH is controlled within a range of 8 to 10 and the ending pH is controlled within a range of 6.5 to 9.

22. The method of claim 1 wherein sodium chloride is present in the reactant mixture.

23. The method of claim 1 wherein the initial condensation pressure is selected so that water is the principal overhead product.

24. The method of claim 23 wherein the reactant is glycerol and the initial condensation pressure is at least 100 mm Hg.

25. The method of claim 23 wherein reactant is glycerol and the initial condensation pressure is at least 150 mm Hg.

26. The method of claim 23 wherein the reaction mixture is continuously stirred to ensure thermal equilibrium throughout.

27. The method of claim 23 wherein inert gas is bubbled through the reaction mixture to ensure thorough mixing and to facilitate water removal.

28. The method of claim 23 wherein, at the completion of the condensation, a minimum of 20% w water, basis total reaction mixture, is added to the reaction mixture to facilitate dissolution and removal of the polyethercyclicpolyols.

29. The method of claim 23 wherein the reaction from initial water evolution to termination takes a time period of four to ten hours.

* * * * *